April 29, 1952      E. MEINCKE      2,594,786
POWDER VALVE
Filed April 12, 1945
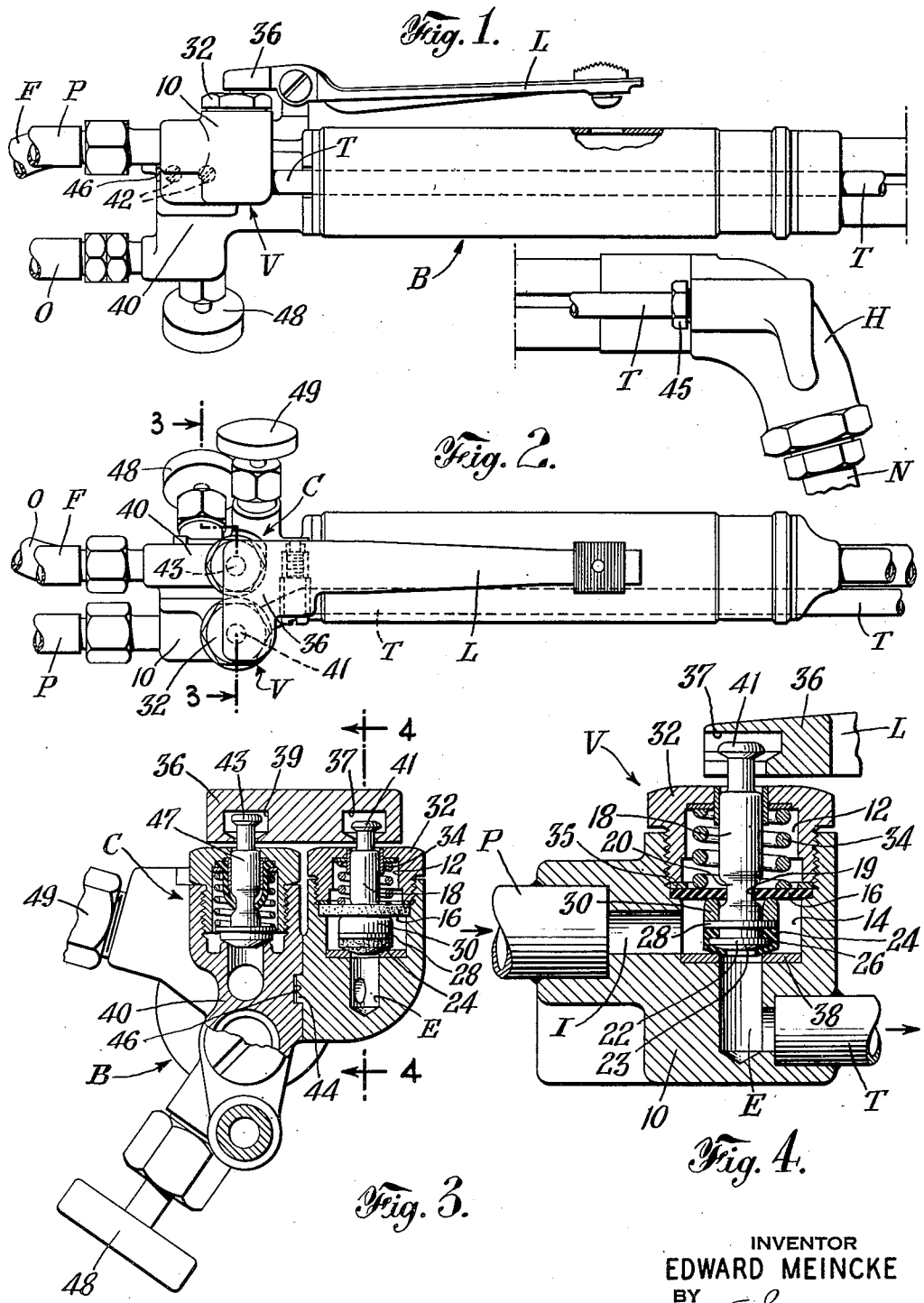
INVENTOR
EDWARD MEINCKE
BY
ATTORNEY Patented Apr. 29, 1952

2,594,786

UNITED STATES PATENT OFFICE 2,594,786

POWDER VALVE

Edward Meincke, Summit, N. J., assignor, by mesne assignments, to Union Carbide and Carbon Corporation, a corporation of New York Application April 12, 1945, Serial No. 587,865

3 Claims. (Cl. 251—31)

1

This invention relates to blowpipes and more particularly to powder valves for oxy-fuel gas cutting and deseaming blowpipes.

The main objects of the invention are to provide an improved blowpipe powder valve; a valve in which the principal moving parts are protected by a flexible diaphragm from the powder laden gas; a valve chamber characterized by the absence of any areas in which the powder can settle and prevent free operation of the valve; a valve for powder-laden compressed fluid comprising seats of hard abrasion resistant material in combination with soft material; a replaceable powder valve removably secured to the body of the blowpipe and which connects with a powder chamber in the blowpipe head; and cutting oxygen and powder valve operating means for causing the powder valve to be opened slightly before the cutting oxygen valve is opened, thus insuring powder flow to the reaction zone prior to the admission of cutting oxygen to such zone.

In a valve handling a powder laden gas stream, tests have indicated that if the volume of the valve chamber is greater when the valve is open than when closed, there will be a tendency to compact this material, thus preventing the valve from sealing. However, if the valve chamber volume remains essentially constant or is greater when closed than when open this situation will not occur. Therefore, another object of the invention is to provide a valve chamber the volume of which is not materially increased when the valve is open.

According to the invention a novel valve is provided in the powder conduit of a blowpipe to control the powder flow at the discretion of the operator. Inasmuch as the powder used is usually metallic and, therefore, highly abrasive, the valve is tight seating and devoid of any glands or any other type of tight fitting or slidable parts into which the powder can collect to cause abrasion, galling or sticking. A valve incorporating these features is suitable for powder deseaming and cutting blowpipes, and for blowpipes employing powder starting.

In the drawing:

Fig. 1 is a two-part fragmentary view in side elevation of a blowpipe exemplifying the invention.

Fig. 2 is a top plan view of a part of the blowpipe.

Fig. 3 is a view mainly in section taken on line 3—3 of Fig. 2.

Fig. 4 is a view mainly in section taken approximately on line 4—4 of Fig. 3.

2

The powder control valve V is composed of a body 10 having a recess which is divided into two chambers 12 and 14. The chambers 12 and 14 are separated from each other by a flexible diaphragm 16. A valve stem 18 extends from outside the valve body 10 through the upper chamber 12, through an opening 19 in the diaphragm 16 and into the lower or powder chamber 14. The stem has a peripheral groove 20 receiving the diaphragm 16, and a peripheral lower end flange 22 having a frusto-conical bottom surface 23.

The lower end portion of the valve stem is provided with a ring 24 of soft material having an inner annular groove 26 receiving the flange 22. The ring 24 is molded in place on the stem 18, and may be composed of rubber, plastic or resilient material. The bottom of the ring 24 is in the shape of a lip which overlies the annular surface 23 and constitutes a soft frusto-conical seat which resists abrasion and provides a good seal when the valve is closed. An annular spacer 30 is disposed on the stem 18 between a washer 28 and the diaphragm.

In the upper chamber 12, between the diaphragm 16 and a cap 32, a compression spring 34 is located which urges the stem 18 to close the valve V when a valve lifting lever 36 is released. The spring is protected from the powder by the diaphragm 16, the peripheral edge portion of the latter being secured in place by the lower rim of the cap 32 which is threaded to the body 10. A slip ring 35 is disposed between such rim and the diaphragm to prevent injury to the latter when the cap is tightened. The powder chamber 14 is shaped so that there are no pockets or crevices in which powder can collect. It will be noticed also that the volume of the powder chamber 14 is approximately the same whether the valve is opened or closed.

The powder in passing through the valve as well as in passing through the rest of the powder system is carried by gaseous means and is therefore, in essence, a thick fog. The powder-laden gas velocity is relatively low at all times but nevertheless the abrasive powder tends to wear any surfaces against which it may impinge. Experience has indicated that the greatest amount of wear within the valve body occurs at the seating surface and for that reason either a hardened steel or other metal washer 38 or a chromium plated surface integral with the body or washer is used to combat such wear.

The powder valve body 10 is removably mounted on one side of gas valve body 40 of blowpipe B. The powder valve body is secured by bolts 42 passing through the body 40 and threaded to the side of the powder valve body 10. A tongue 44 and groove 46 connection is provided between the parts.

The valve bodies 10 and 40 communicate by couplings and conduits O, F and P to suitable sources of oxygen, acetylene and powder, respectively. The powder source includes a fluid such as air under substantially constant pressure. The body 10 has a powder inlet I and a powder outlet E. The powder inlet I is located in one side of the powder chamber 14, and the powder outlet E is located in the bottom of such chamber. The body 40 is provided with preheat oxygen, and acetylene valves 48 and 49.

The powder chamber 14 has an annular side wall and a flat bottom surface. The washer 38 constituting the valve seat is disposed on the bottom surface of the chamber 14 with the top surface of the seat in line with the bottom surface of the inlet I, and the inner periphery of the seat in line with the outlet E. The outer periphery of the washer 38 fits the annular wall surface of the chamber 14. Thus, with the diaphragm 16, constituting the top of the chamber 14, located above the inlet I, the chamber is shaped so as to prevent powder from collecting in such a way as to interfere with the operation of the valve.

The blowpipe comprises a head H and nozzle N. Powder reaches the head H by means including a tube T. In the case of hand cutting and deseaming blowpipes the powder valve V and powder tube T leading to the blowpipe head H are removable as a unit since the front end of the powder tube is detachably secured to head H by a coupling nut 45. In the machine cutting blowpipes, however, only the powder valve is removable, the powder tube being a permanent part of the blowpipe assembly.

In the case of the hand cutting and deseaming blow-pipe shown in the drawing, the powder valve V and cutting oxygen valve C are operated in sequence by the same lever L. This lever is arranged so that the powder and cutting oxygen valves open sequentially by having the effective length of the stem 13 shorter than that of the stem 47. The base of the lever has recesses 37 and 39 receiving flanges 41 and 43 of the stems.

When the lever L is depressed the powder valve V partially opens slightly ahead of the cutting oxygen valve C and a small burst of powder leaves the nozzle N, is preheated by the preheat flames, and is deposited in a reaction zone on the surface of the material to be processed. Then, when the cutting oxygen is admitted into the reaction zone, by depressing the lever L still farther so that the cutting oxygen valve C opens, the preheated powder immediately burns producing sufficient heat to elevate the surface material to the ignition temperature, at which time the blowpipe can be moved progressively along the surface of the material to remove material and form a kerf or a groove. With this arrangement no auxiliary starting means need be employed, it only being necessary for the operator in initiating a cut to depress the lever L in one continuous but relatively slow movement.

If the blowpipe is equipped with a conventional powder cutting nozzle, the valve lever can be depressed thus causing the cutting oxygen and the powder envelope to issue from the end of the nozzle and when the compound cutting stream composed of the outer envelope of burning preheat gas, the inner envelope of adjuvant powder and the center core of cutting oxygen is brought up to the leading side of the material to be cut, an instantaneous start is produced and the material can be severed by a continuous forward movement of the blowpipe.

The cutting oxygen and powder valves are located on the same side of the blowpipe body, both valves being operated from the common cam lever L because, as was explained in connection with the hand cutting blowpipe, the cutting oxygen and powder can both be turned on before the cutting stream reaches the material to be severed, with an instantaneous or flying start being produced as soon as the compound cutting stream has reached the material surface.

While the invention has been shown, by way of example, in connection with a hand blowpipe, the powder valve may be mounted on one side of a machine cutting blowpipe and used with an adapter for converting the machine cutting blowpipe to a powder cutting blowpipe. Also, the powder valve may be located in spaced relation to the blowpipe, and the lever may be operated by a suitable power device, which is remotely controlled, to open and close the valve.

I claim:

1. A powder-laden compressed-fluid valve construction comprising, in combination, a body having a valve chamber provided with a central outlet, a diaphragm constituting the top of said chamber above said inlet, said diaphragm having a central hole, a valve composed of soft material in said chamber adapted to cooperate with said seat, a valve stem extending through such hole, annular spacing means extending longitudinally of said stem and disposed between said valve and said diaphragm, and a compression spring of substantially the same diameter as said annular means surrounding said stem and acting on the annular area of said diaphragm opposite said annular means, urging the valve closed and also urging the diaphragm into powder sealing contact with said annular means.

2. A powder-laden compressed-fluid valve construction comprising the combination of a body having a recess consisting of a powder-laden compressed-fluid outlet, a valve chamber, and a spring chamber, the outlet and chambers being axially alined with the spring chamber above and the outlet below the valve chamber, and graduated in size so that the diameter of the valve chamber and that of the spring chamber are about three times that of the outlet, said body also having a powder-laden compressed-fluid inlet in the side wall of such valve chamber, a flat annular valve seat composed of hard abrasion resistant material fitting the bottom of said valve chamber and having an inner periphery contiguous with the outlet, a flexible diaphragm separating said chambers adjacent the top of said inlet, the peripheral edge of the diaphragm being seated on the annular bottom of said spring chamber, a slip ring mounted on said diaphragm, a cap threaded in said spring chamber and engaging said slip ring to clamp the peripheral edge of said diaphragm in place, a valve stem extending axially from outside of the body through a hole in the cap, the spring chamber, an opening in the diaphragm and into the valve chamber, said stem having an annular groove receiving the diaphragm, the stem also having a peripheral lower flange and a somewhat flat frusto-conical bottom surface, a valve composed of soft material mounted on the lower end portion of said stem and having an inner annular groove receiving said flange, the stem being provided with annular spacing means between the valve and diaphragm, the peripheral surface of such spacing means being contiguous with that of the valve, and a compression spring in said spring chamber acting against the top of said cap and said diaphragm for normally urging the valve toward said seat through said diaphragm and said annular means, the arrangement being such that the valve may be opened by lifting said stem axially against the force of said spring.

3. A powder-laden compressed-fluid valve construction comprising the combination of a body having a recess consisting of a powder-laden compressed fluid outlet, valve chamber and a spring chamber, the outlet and chambers being axially alined with the spring chamber above and the outlet below the valve chamber, the diameters of the chambers being about three times that of the outlet, said body also having a centrally apertured flexible diaphragm between said chambers, powder-laden compressed-fluid inlet means in the side wall of said valve chamber, a flat annular valve seat composed of hard abrasion resistant material fitting the bottom of said valve chamber and having an inner periphery contiguous with the outlet, the peripheral edge of said diaphragm being seated on the annular bottom of said spring chamber, a slip ring mounted on said diaphragm, a cap threaded in said spring chamber and engaging said slip ring to clamp the peripheral edge of said diaphragm in place, a spring in said spring chamber urging said diaphragm toward said valve chamber, a valve stem extending axially from outside of the body through a hole in the cap, the spring chamber, the opening in the diaphragm and into the valve chamber, said stem having an annular groove intermediate its ends, the aperture of said diaphragm being stretched over one of said ends and snapped into said annular groove and sealing said spring chamber against powder leakage from said valve chamber without permitting pressure actuation of said diaphragm, the stem also having a peripheral lower flange and a flat bottom surface, a valve composed of soft material mounted on the lower end portion of said stem and having an inner annular groove receiving said flange, the stem being provided with annular spacing means between the valve and diaphragm, the peripheral surface of such spacing means being contiguous with that of the valve, and a compression spring in said spring chamber acting against the top of said cap and said diaphragm for normally urging said valve toward said seat through said diaphragm, the arrangement being such that the valve may be opened by lifting the stem axially against the force of said spring.

EDWARD MEINCKE.

REFERENCES CITED

The following references are of record in the file of this patent:

UNITED STATES PATENTS

| Number | Name | Date |
|---|---|---|
| 154,177 | Flanders | Aug. 18, 1874 |
| 1,040,226 | Lukacsevics | Oct. 1, 1912 |
| 1,859,504 | Fielder | May 24, 1932 |
| 1,951,037 | Patterson | Mar. 13, 1934 |
| 1,987,784 | McDonald | Jan. 15, 1935 |
| 2,093,678 | Jacobsson | Sept. 21, 1937 |
| 2,094,222 | Smith | Sept. 28, 1937 |
| 2,136,940 | Ehbrecht | Nov. 15, 1938 |

FOREIGN PATENTS

| Number | Country | Date |
|---|---|---|
| 13,035 | Great Britain | 1914 |
| 716,166 | France | 1931 |
| 309,136 | Italy | 1933 |